(No Model.)  7 Sheets—Sheet 1.

H. B. LESTER.
WIRE NAIL MACHINE.

No. 334,248. Patented Jan. 12, 1886.

Witnesses,
E. C. Perkins
C. E. Ruggles

Inventor,
Harry B. Lester
By H. M. Wooster
Atty.

(No Model.)  H. B. LESTER.  7 Sheets—Sheet 4.

WIRE NAIL MACHINE.

No. 334,248.  Patented Jan. 12, 1886.

Witnesses,
E. C. Perkins
C. E. Ruggles

Inventor,
Harry B. Lester
By H. M. Wooster
Atty.

(No Model.)
7 Sheets—Sheet 5.
H. B. LESTER.
WIRE NAIL MACHINE.
No. 334,248.　　　　Patented Jan. 12, 1886.
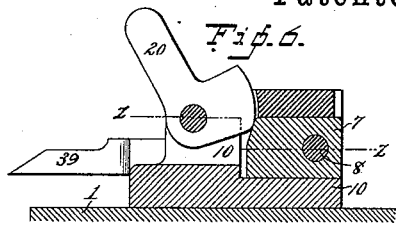
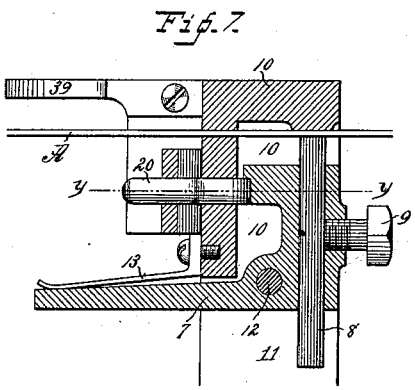
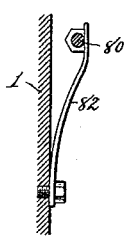
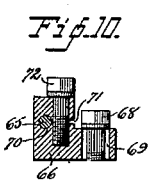
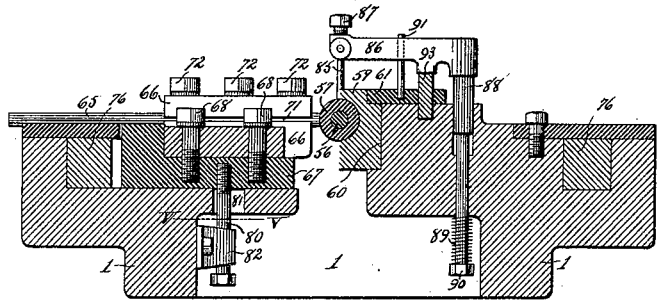
Witnesses,
E. C. Perkins
C. E. Ruggles
Inventor,
Harry B. Lester
By A. M. Wooster
Atty.

(No Model.) 7 Sheets—Sheet 6.

H. B. LESTER.
WIRE NAIL MACHINE.

No. 334,248. Patented Jan. 12, 1886.

Witnesses:
C. C. Perkins.
C. E. Ruggles

Inventor,
Harry B. Lester
By A. M. Wooster
Atty.

(No Model.) 7 Sheets—Sheet 7.

H. B. LESTER.
WIRE NAIL MACHINE.

No. 334,248. Patented Jan. 12, 1886.

Witnesses,
C. C. Perkins.
C. E. Ruggles

Inventor,
Harry B Lester
By A. M. Wooster.
Atty.

UNITED STATES PATENT OFFICE.

HARRY B. LESTER, OF WATERBURY, CONNECTICUT, ASSIGNOR TO BLAKE AND JOHNSON, OF SAME PLACE.

WIRE-NAIL MACHINE.

SPECIFICATION forming part of Letters Patent No. 334,248, dated January 12, 1886.

Application filed August 10, 1885. Serial No. 173,946. (No model.)

*To all whom it may concern:*

Be it known that I, HARRY B. LESTER, a citizen of the United States, residing at Waterbury, in the county of New Haven and State of Connecticut, have invented certain new and useful Improvements in Machines for Making Wire Nails; and I do hereby declare the following to be a full, clear, and exact description of the invention, such as will enable others skilled in the art to which it appertains to make and use the same.

My invention relates to the general class of machines by which wire nails, escutcheon-pins, tacks, brads, finishing-nails, &c., with either round, flat, cone-shaped, or countersunk heads, are formed from a continuous piece of wire fed to the machine, the object of my invention being to strengthen and improve in a general way, and at the same time to simplify and cheapen, the construction of this class of machines, the parts upon which wear comes being readily adjusted or replaced, the operative parts being perfectly balanced, and the motions being imparted by means of a crank, cams, and eccentrics upon the main shaft. In order to accomplish these results, and to produce in brief a simple, strong, light-running, and durable machine for the manufacture of all classes of wire nails, I have devised the novel construction which I will now describe, referring by numbers to the accompanying drawings, forming part of this specification, in which—

Figure 1:
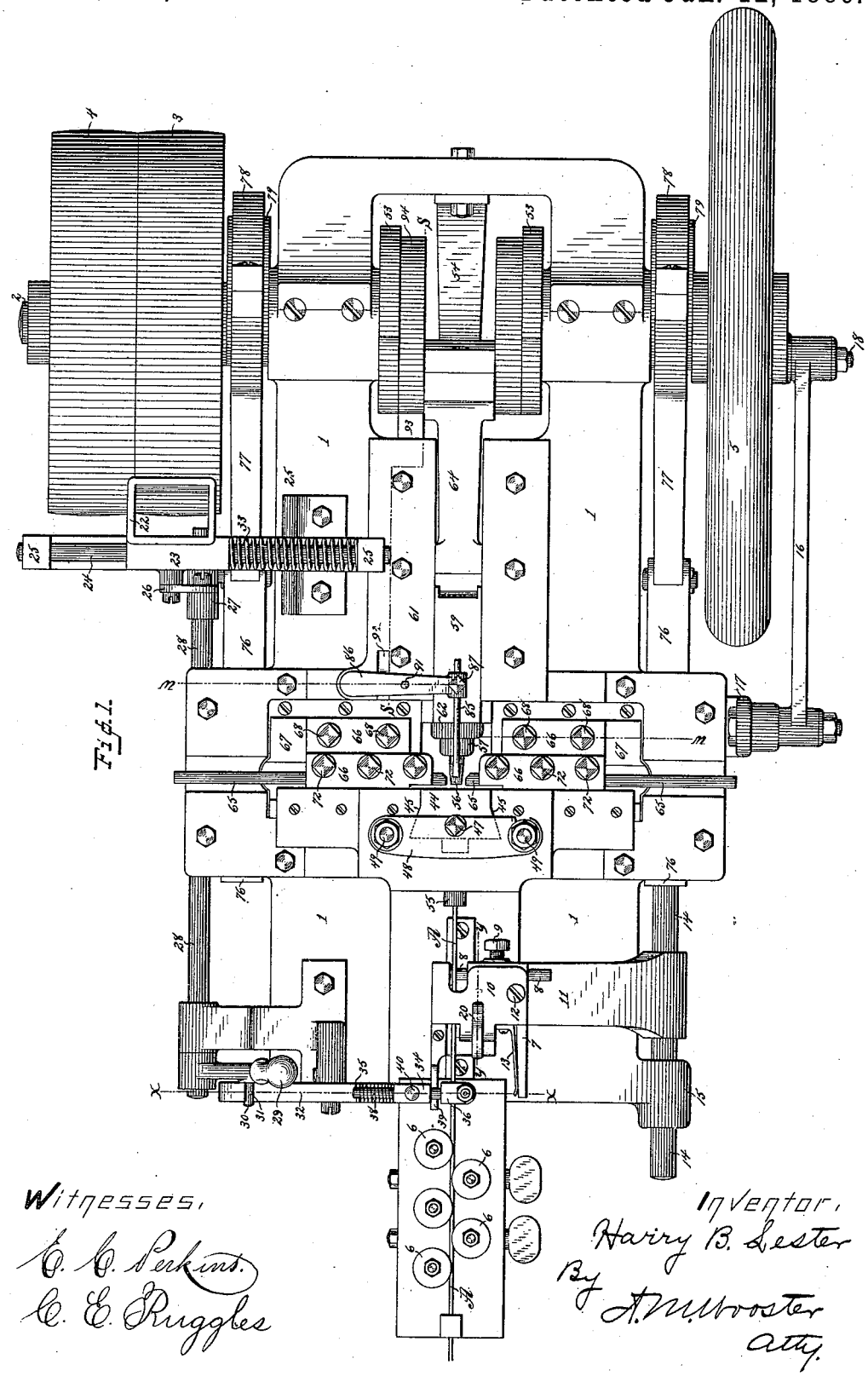
Figure 2:
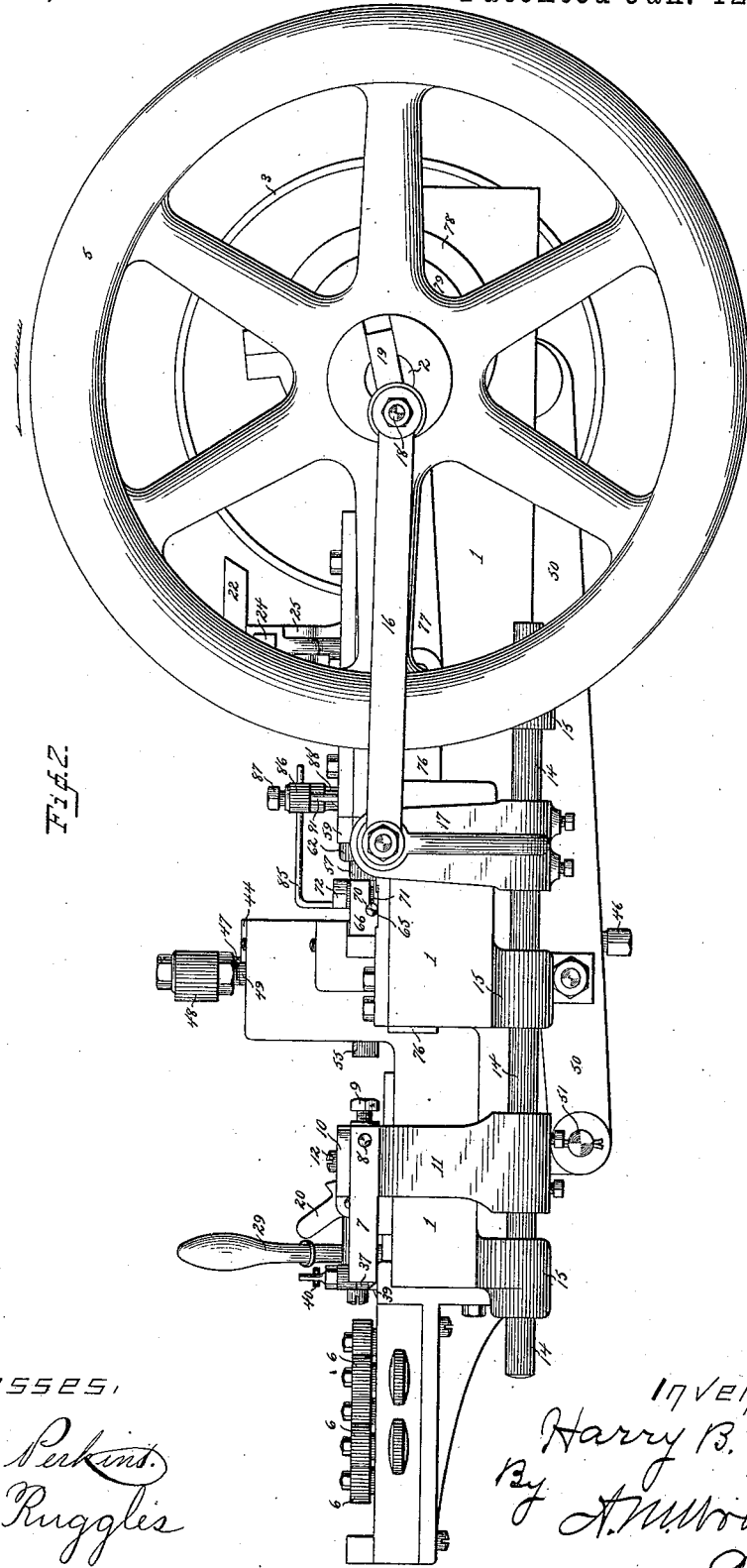
Figure 3:
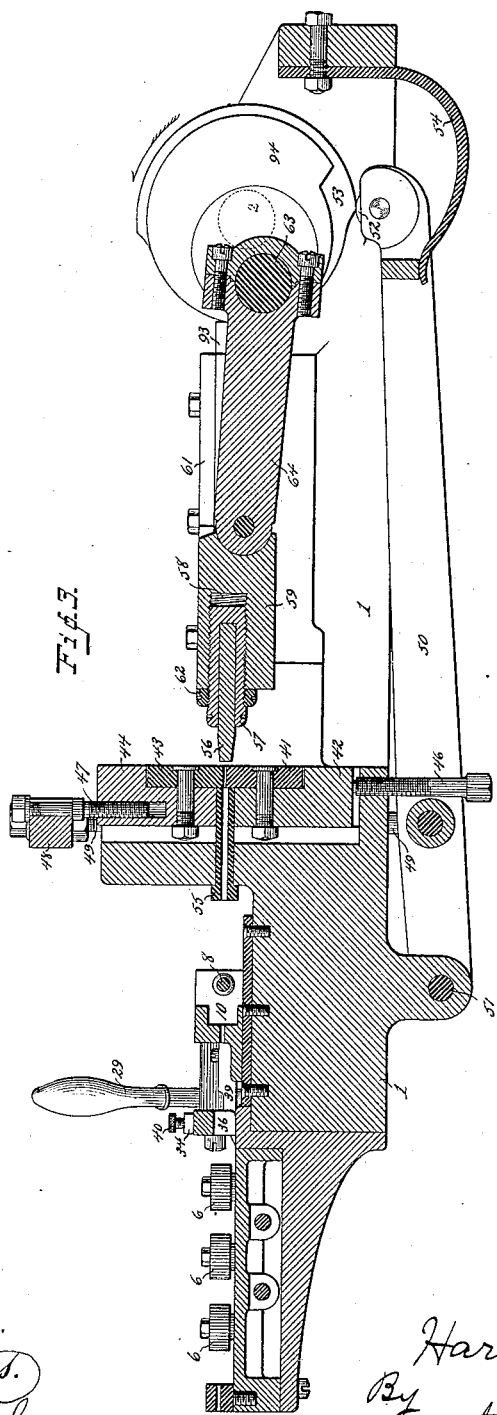
Figure 4:
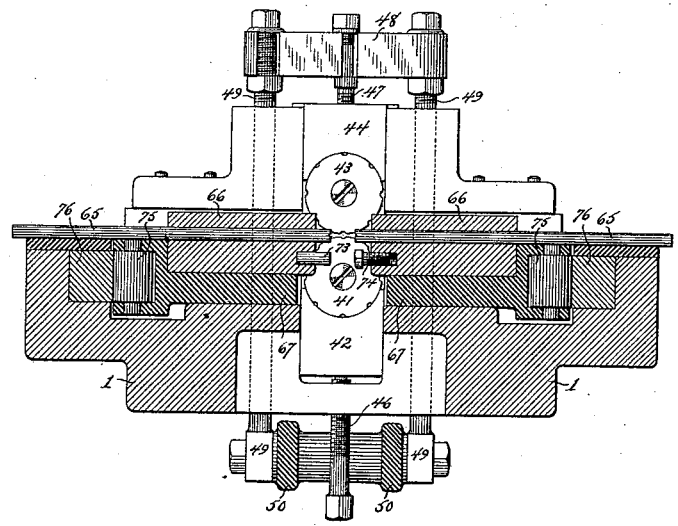
Figure 5:
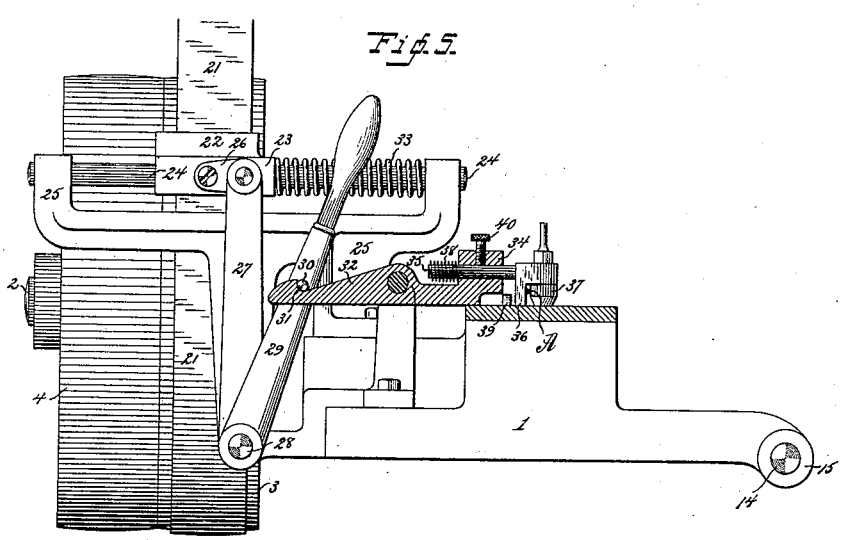
Figure 11:
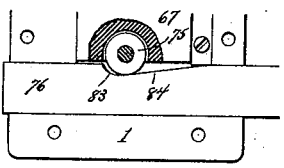
Figure 12:
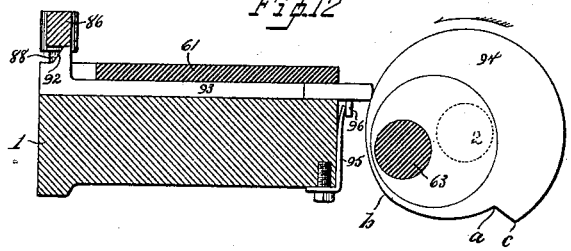
Figure 13:
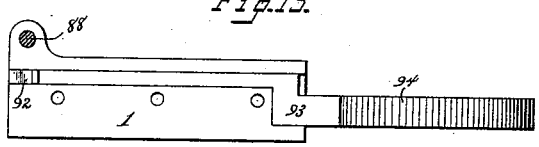
Figure 14:
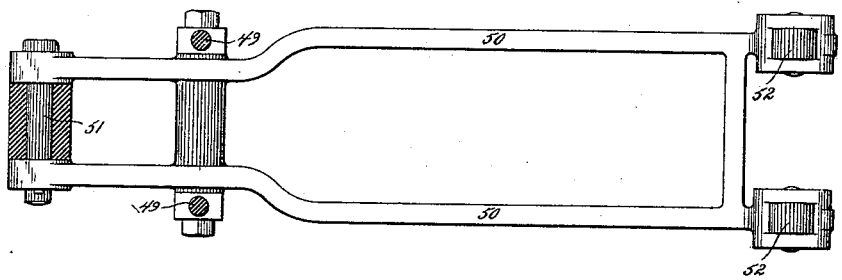

Figure 1 is a plan view of the entire machine; Fig. 2, a side elevation, the legs being omitted for the sake of clearness; Fig. 3, a central vertical longitudinal section, the clearer and certain parts back of the central line being removed; Fig. 4, a cross-section of the machine on the center line of the cutters, the cutters themselves being in elevation; Fig. 5, a section on the line $x\,x$ in Fig. 1, looking toward the rear, the driving and loose pulleys and the entire belt-shifting mechanism being in elevation, with intermediate parts omitted. Figs. 6 and 7 are detail views illustrating the mechanism for stopping the feeding of the wire, Fig. 6 being a section on the line $y\,y$ in Figs. 1 and 7, and Fig. 7 a section on the line $z\,z$ in Fig. 6. Fig. 8 is a section on the line $w\,w$ in Fig. 1, the clearer being in elevation; Fig. 9, a detail sectional view on the line $v\,v$ in Fig. 8; Fig. 10, a section of the block which carries the cutters, showing the adjustment of the cutters toward or from the dies, whereby the amount of stock in the nail-heads is determined; Fig. 11, a detail plan view of one of the slide-cams, showing the roller at the outer end of the cross-slide which engages the face of the cam; Fig. 12, a detail sectional view on the line $s\,s$ in Fig. 1, to show the face-cam and slide-cam which operate the clearer. Fig. 13 is a plan view corresponding with Fig. 12, the cap-plate, &c., being removed; Fig. 14, a plan view of the double lever which operates the upper die, the rods, and the bracket from which the lever is hung, being in section; and Figs. 15, 16, 17, and 18 are diagrams illustrating successive steps in the formation of a nail, the action of the cutters being clearly illustrated in Fig. 4. Figs. 1 to 14, inclusive, with the exception of Figs. 6 and 7, are drawn quarter-size. Figs. 6 and 7 are drawn half-size.

Similar numbers denote the same parts in all the figures.

1 is the bed of the machine, supported in any suitable manner, ordinarily on legs, which, however, for convenience in illustration are not shown.

2 is the main shaft; 3, the fast pulley; 4, the loose pulley, and 5 the balance-wheel.

Turning now to the front of the machine, as the wire A enters it is passed between a series of straightening-rollers, 6, which may be adjusted to different sizes of wire in any suitable manner.

Passing by the device for stopping the machine when the wire is exhausted, I will first describe the feeding mechanism, which is shown in Figs. 1 and 2, and in detail in Figs. 6 and 7.

The feed proper consists of an angle-lever, 7, one arm of which carries a rod, 8, the inner end of which grips the wire. This rod is adjustable, and is secured in any desired position by a set-screw, 9.

10 represents the carrier for the feeding mechanism, which is, in fact, a continuation of arm 11, which will be again referred to. The carrier slides upon a portion of the bed of the machine, being retained in position by a guide of ordinary construction. The angle-lever is pivoted in a recess in the carrier, as clearly shown in the figures referred to.

12 is the angle-lever pivot.

13 is a spring pivoted to the carrier, the end of which acts against the long arm of the angle-lever, causing rod 8, which is carried by the other arm, to grip the wire, as shown in Fig. 7. Arm 11 is made fast in any suitable manner to feed-carrying rod 14, which reciprocates in guides 15, which are cast upon the frame-work of the machine. Longitudinal reciprocating motion is imparted to the feed-carrying rod by means of a connecting-rod, 16, one end of which is pivoted to an arm, 17, which is secured in any suitable manner to the feed-carrying rod, the other end of the connecting-rod being pivoted to a stud, 18, upon a slide, 19, which is secured in any suitable manner in the hub of the balance-wheel. The adjustment of this stud toward or from the center of the main shaft controls the throw of the feeding mechanism, thereby determining the length of wire given to each nail.

It will be observed in Fig. 7 that pivot 12, upon which the angle-lever turns, is not placed in line with gripping-rod 8, but lies considerably within the line in which said rod operates—that is, toward the supply.

The operation of the feeding mechanism is substantially as follows: Each revolution of the main shaft imparts to the feeding mechanism a forward and backward movement. At the moment of the forward movement the resistance is from the direction of the supply of wire—that is, outside of the machine. At the moment of the backward movement the wire is gripped in front of the feeding mechanism by the dies, as will be more fully explained. It will thus be seen that the position of the pivotal point of the angle-lever relatively to the point to which the wire is gripped is such that when the forward movement of the carrier takes place the greater the resistance upon the wire the closer it will be gripped by rod 8, the resistance of the straightening-rollers being sufficient at all times to insure its being firmly held and carried forward, and that when the backward movement takes place, the resistance being in front of the feeding mechanism—that is, toward the back of the machine—the tendency is to loosen the grip of rod 8 upon the wire, thus allowing the gripping mechanism to slide back freely over the wire.

20 (see Figs. 2, 6, and 7) represents a cam-lever pivoted in the carrier, which acts, when turned to its forward position, to throw angle-lever 7, and with it the gripping-rod, out of operative position, so that while the machine may be running as usual there is no grip upon the wire, the feeding mechanism being caused to slide backward and forward over it freely, but without taking hold thereon and without moving it in the slightest.

In the drawings, lever 20 is shown as out of engagement with the angle-lever, that being its normal position.

Turning to Fig. 6, when it is desired to stop the feed temporarily without stopping the machine, the handle end of lever 20 is moved toward the right—that is, forward. This causes the cam portion of said lever to engage the angle-lever and throw it out of operative position against the power of spring 13. The lever is made to turn sufficiently hard so that it will be held by friction wherever it may be placed.

The mechanism for stopping and starting the machine is clearly illustrated in Figs. 1 and 5.

21 (see Fig. 5) represents a belt, which is shown as passing over a tight pulley. This belt passes through a guide, 22, which is cast integral with a sliding block, 23. This block is adapted to move backward and forward upon a rod, 24, carried by bracket 25.

26 is a link pivoted to the sliding block and also to an arm, 27, the other end of which is attached to a rock-shaft, 28, which is supported in brackets at the side of the machine and extends toward the forward end thereof.

29 is a hand-lever secured to rock-shaft 28 and provided with a pin, 30, which is adapted to engage a notch, 31, at the outer end of a lever, 32. The inner end of this lever, being much heavier than the outer end, serves as a counterbalance, and retains the outer end at its operative position—that is, in engagement with the pin.

In the drawings, the belt is shown as upon the tight pulley, and the machine consequently in operation.

To stop the entire machine, lever 29 is released from notch 31 and turned toward the left from the position shown in Fig. 5.

In the drawings I have shown a heavy coiled spring, 33, upon rod 24, one end of which bears against the sliding block, the other against the inner end of bracket 25. The action of this spring is to force block 23 toward the left the instant the hand-lever is released. As will be readily understood from Figs. 1 and 5, this movement will carry the belt-guide toward the left, and consequently shift the belt from the tight to the loose pulley, which, of course, causes the machine to stop very quickly. When it is desired, however, to stop the feed instantly, that may be done by means of cam-lever 20, as already explained, so that although the machine does not stop the instant the belt is shifted the feed may be stopped instantly, thus preventing any damage in the event of the breakage of any of the parts or the failure of the nails to clear.

In Figs. 1, 5, 6, and 7, I have illustrated a very simple device for automatically stopping the machine as soon as the coil of wire becomes exhausted. The inner end of lever 32 is provided with a head or enlargement, 34, which is provided with an opening through which a rod, 35, slides. At the inner end of this rod is a flange, 36, and a roller, 37. A spring, 38, coiled around rod 34, and bearing against the head, acts to force the rod, and parts carried thereby, toward the left from the position shown in Fig. 5. The wire, as it is fed into the machine, passes between the flange and the roller, so that until the coil is exhausted the parts are held in the position shown in Fig. 5. As soon, however, as the end of the coil or piece of wire passes the last of the straightening-rollers spring 38 will draw rod 35, and the parts carried thereby, toward the left.

In the figures referred to last above it will be noticed that carrier 10 has attached thereto a wedge, 39. This wedge of course reciprocates with the carrier. When the parts are in the position shown, this wedge passes between flange 36 and head 34. When, however, the supply of wire is exhausted and the flange is moved toward the left, this wedge passes under the flange and acts to raise the inner end of lever 32, and to depress the outer end, which releases the pin upon the hand-lever and allows spring 33 to move the belt-guide toward the left, thus shifting the belt to the loose pulley and causing the machine to stop. When it is not desired that this stopping device should act, rod 35 is secured in the position shown by means of a set-screw, 40, whose point bears against said rod.

Turning now to Figs. 1, 3, 4, and 14, I will describe the dies and die-operating mechanism.

41 represents the lower die, which is carried by a die-block, 42. 43 represents the upper die, which is carried by a die-block, 44. Both die-blocks are adapted to slide in ways 45.

46 is a set-screw operated from below, which bears against the lower die-block to give it the desired adjustment.

In use the lower die-block and die are stationary.

The upper die-block is carried by a screw-bolt, 47, which engages said die-block and projects above it, the upper portion of said bolt being adapted to be engaged by a cross-piece, 48, extending across between two vertical rods, 49, which extend down through the frame-work of the machine, as indicated in dotted lines in Fig. 4, and are pivoted to a double lever, 50, which extends longitudinally under the bed of the machine. The forward end of this lever is pivoted to the bed of the machine, as at 51. From this point it extends backward toward the rear of the machine.

The two side pieces which constitute this lever are provided at their rear ends with rollers 52, which bear against cams 53 upon the main shaft, the rollers being held in contact with said cams by a heavy spring, 54, the free end of which bears upon a cross-piece of the lever. As the rollers are held constantly against the surface of the cams, it follows that rods 49 and the upper die-blocks must have an upward and downward movement imparted to them by each revolution of the main shaft. It will be seen, furthermore, that, if desired, the upper die may be caused to grip the wire with enormous pressure. The dies themselves are ordinary circular dies and are recessed into the die-blocks, being carried by strong bolts. The dies, however, have no vertical or longitudinal movement, except as the die-blocks are moved.

In order to provide easy means for removing the dies, I have constructed cross-piece 48 so that it will swing upon one of the vertical rods and may be turned entirely out of the way when it is desired to remove the die-block.

The figures of the drawings show the cross-piece as in engagement with bolt 47 and with the vertical rod, to which it is not pivoted—that is, the one at the left in Fig. 4.

When it is desired to adjust the upper die-block, it is simply necessary to turn bolt 47 to the right or left, as the case may be, thus raising or lowering the die-block without an instant's delay.

When it is desired to remove the die-block, it is simply necessary to swing the cross-piece away from the left-hand vertical rod and from bolt 47. This leaves the upper or both die-blocks free to be lifted out by hand.

55 is a guide tube, which conducts the wire to the dies. This tube lies loosely enough in the frame-work, so that it may be readily withdrawn, which is of course necessary when it is desired to lift out the lower die-block.

Slight and unimportant changes in the construction of the bed would make the lower die-block removable from below. Having replaced the die-blocks, the cross-piece may be instantly swung back into place, as shown in the figures. The cross-piece is preferably provided with notches, (see Fig 4,) which engage one of the vertical rods and screw-bolt 47.

The parts of the machine are so timed that when the forward movement of the feeding mechanism takes place the upper die is raised. At the instant that this movement of the feeding mechanism is completed the upper die closes down upon the wire and holds it firmly. While the wire is held between the dies the backward movement of the feeding mechanism takes place, and also the movement of the heading mechanism, which will presently be explained.

Turning now to Figs. 1, 3, 8, 15, 16, 17, and 18, I will describe the operation of the heading mechanism.

56 is the bunter, carried by a sleeve, 57, which is externally screw-threaded to engage a correspondingly-threaded opening, 58, in a cross-head, 59. This cross-head slides in ways 60 in the bed of the machine, being held in position by cap-plates 61.

The right-hand half of Fig. 8 illustrates the arrangement of these parts perfectly clearly, it being understood of course that the two halves of said figure are upon different transverse lines. The shape of the face of the bunter of course determines the style of head that is given to the nails, a smooth face making a flat-headed nail. If a round or cone-shaped head is desired, the proper recess is made in the bunter. If countersunk heads are desired, the proper recesses must be made in the faces of the dies.

As will be seen in Fig. 3, the adjustment of the bunter is secured by turning sleeve 57 slightly in the opening in the cross-head, either in or out, as the case may be. Having secured the proper adjustment for the bunter, the parts are secured in that position by means of a check-nut, 62, which engages the exterior of the sleeve and is turned up against the face of the cross-head. Reciprocating motion is imparted to the cross-head by means of a crank, 63, on the main shaft at the center of the machine, and connecting-rod, 64, pivoted to the cross-head, all of which is clearly shown in Fig. 3, taken in connection with Fig. 1, in which the parts are shown in plan.

Figure 15:
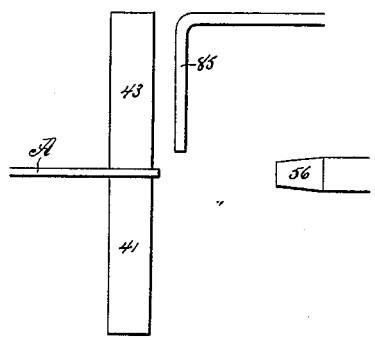
Figure 17:
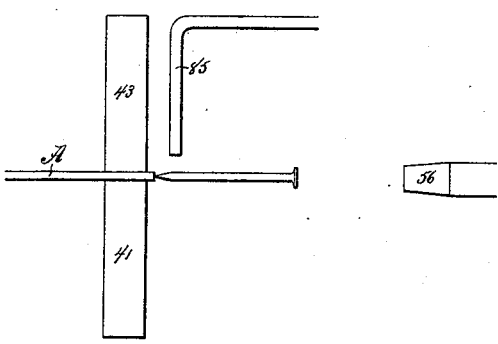
Figure 16:
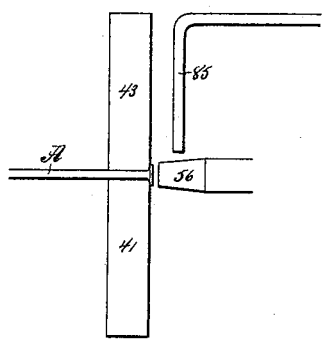
Figure 18:
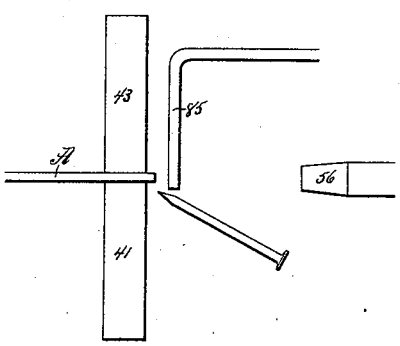

The action of the bunter is clearly illustrated in diagram, Figs. 15 to 18, inclusive. In Fig. 15 the wire has been thrown forward by the feeding mechanism and gripped by the dies, and the forward movement of the bunter has commenced. In Fig. 16 the bunter has formed the head of the nail and the return movement has commenced. At this instant the feeding mechanism again commences to act, and the newly-formed head follows the bunter until the parts are substantially in the position indicated in Fig. 17, in which figure the nail is shown as having been operated on by the cutters, which I will now describe, referring more particularly to Figs. 1, 4, 8, 9, 10, and 11.

65 represents the cutters, the essential feature of my invention being that the chisels or cutting-edges are formed at the ends of steel rods, thus permitting of their being sharpened so long as there is enough of the rods left to be held by the cutter-blocks, as will be more fully explained. These cutters are carried by cutter-blocks 66, which in turn are secured to slides 67 by bolts 68, which pass through slots 69. The object of these slots is to permit the adjustment of the cutters relatively to the dies, which determines the amount of metal allowed for the head of each nail.

My improved manner of securing the cutters in place is as follows: Each block is provided with a longitudinal hole, 70, to receive one of the cutters. 71 is a horizontal slot leading into this hole. 72 represents bolts which pass down through the blocks between hole 70 and the outer opening of the slot. By tightening these bolts the metal of the block is caused to spring sufficiently to clamp the cutter.

The devices for adjusting the cutter-blocks and for clamping the cutters are clearly illustrated in Figs. 8 and 10. It will be readily understood that the adjustment of the cutters requires but a moment's time. In order, however, to prevent the possibility of the faces of the cutters coming in contact with each other, I have provided a stop, which is clearly illustrated in Fig. 4, and consists of a heavy pin, 73, which projects from the inner end of one of the cutter-blocks and strikes against the head of a screw, 74, which projects from the inner end of the other cutter-block. The desired adjustment may be readily secured by giving screw 74 a slight turn either in or out, as may be required. The shape of the points of the nails is determined of course by the shape of the cutting-edges. I have not illustrated any special shape of cutting-edge, as I make no claim thereto; but contemplate using any style of cutting-edge that may be required by the class of nail that is to be produced. The outer ends of the slides are provided with rollers 75, which are engaged by slide-cams 76. These parts may of course be of any suitable construction; but I preferably construct them substantially as shown in Fig. 11. Motion is imparted to the slide-cams by means of connecting-rods 77 and straps 78, which encircle eccentrics 79 upon the main shaft. Each slide is provided with a pin, 80, which projects downward through slot 81 in the bed of the machine and forms a bearing for a spring, 82, (see Figs. 8 and 9,) which acts to hold the slide to its retracted position—that is, in the present instance, with the roller lying in recess 83 in the slide-cam. In Fig. 11 the slide-cam is shown at its retracted position, the edges of the cutters being in the position shown in Fig. 4. As the forward movement of the slide-cams takes place, rollers 75 are forced to ride up the inclines 84 upon the slide-cams, the action of which is to force the slides, and with them the cutter-blocks and cutters, forward with great power thus forming at one operation the point of the nail and severing the completed nail from the piece of wire. The effect of the action of the cutters is clearly shown in diagram Fig. 17.

As it is possible that the nail may not be entirely severed from the piece of wire by the action of the cutters, I have provided a clearer, the construction and operation of which will be clearly understood by reference to Figs. 1, 2, 8, 12, 13, and diagrams 15 to 18, inclusive. The clearer proper consists of an arm, 85, which may be of any suitable shape to accomplish the desired result. This arm is adjustably secured in the carrier 86, being held at the desired position by a set-screw, 87. The carrier is provided with a downwardly-projecting arm, 88, which passes through the bed of the machine, and with a spring, 89, which bears against the under side of the bed and against a nut, 90, at the end of arm 88, and acts to draw the clearer downward, as illustrated in diagram Fig. 18. The use of the clearer insures the detachment of the completed nail before the bunter can strike another blow. If, however, it is not desired to use the clearer, it may readily be removed by loosening set-screw 87.

91 is a guide-pin projecting upward from cap-plate 61, or from the bed of the machine, as the case may be, which passes through carrier 86 and acts to prevent its displacement in use.

The clearer is operated by means of an incline, 92, at the end of a slide, 93. The rear end of this slide bears against a cam, 94, on the main shaft. It will be observed in Fig. 12 that about three-fourths of the periphery of this cam is a perfect cylinder, the cam action being wholly between the points indicated by $a$ and $b$. As indicated by the arrow, the rotation is from right to left.

95 is a spring secured to the bed of the machine, the free end of which bears against a lug, 96, on the under side of the slide and acts to hold the rear end of the slide against the face of the cam. When the cam has reached the portion of its rotation at which the point indicated by $b$ bears against the end of the slide, the parts will be in the position indicated in the several figures of the drawings, with the exception of diagram Fig. 18. The parts remain in this position as the rotation proceeds until the point of the periphery indicated by $c$ is reached, at which instant spring 95 will cause the rear end of the slide to drop down to that point in the cam-surface which is indicated by $a$. This movement allows spring 89 to draw the clearer down to the position shown in diagram Fig. 18, which completes the action of the clearer. The upward movement begins instantly and continues until the point indicated by $b$ is reached, that being the highest point in the movement of the clearer, at which it remains until point $c$ is reached again, when the backward movement of the slide and the downward movement of the clearer are repeated, as before.

The operation of the entire machine may be briefly described as follows: Having passed the straightening-rollers, the wire is gripped by the feeding mechanism and carried forward a predetermined distance, which is the exact distance required to leave enough wire projecting beyond the face of the dies to form the head of the nail. At the instant the movement of the feeding mechanism is completed the downward movement of the upper die takes place, which grips the wire firmly between the upper and lower dies, the latter being preferably stationary, as described. While the end of the wire is thus held between the dies, the return movement of the feeding mechanism takes place, and the blow of the bunter forms the head of a nail. At this instant the second forward movement of the feeding mechanism takes place, the dies again grip the wire, and the completed nail is severed and displaced by the action of the cutters, supplemented, preferably, by the action of the clearer. The instant these operations are accomplished the second movement of the bunter takes place, which forms the head of the second nail.

As has already been described, the shape of the points of the nails is governed by the shape of the edges of the cutters.

The amount of metal allowed for the head of each nail depends upon the adjustment of the cutters relatively to the face of the dies. The shape of the head of the nails being determined by the shape of the face of the bunter, and, in the case of countersunk heads, by recesses in the faces of the dies, in connection with the face of the bunter.

The parts of the machine are made adjustable, and the weight of metal in the machine accurately balanced, the bunter being operated by a crank on the main shaft at the center of the machine, the holding-die being operated by cams on opposite sides of the crank and equidistant therefrom, and the cutters being operated by eccentrics on the main shaft, also equidistant from the crank at the center.

The stopping and starting mechanism is controlled in the simplest manner possible, and has connected therewith a device for automatically stopping the machine when the supply of wire gives out. In addition to this another device is provided, whereby the feeding of the wire may be stopped instantly, whether the motion of the machine is stopped or not.

Having thus described my invention, I claim—

1. The combination, with the carrier, the gripping-lever, and spring 13, of a cam-lever adapted to act on the gripping-lever to turn and hold the latter out of operative position, whereby the feeding of the wire may be stopped instantly without stopping the machine.

2. Rod 24, block 23, adapted to slide thereon and carry the belt-guide, and spring 33, acting against said block, in combination with the rock-shaft, arm 27, link, hand-lever, notched lever 32, rod 35, having flange, roller, and spring, and wedge 39, all arranged as described, and for the purpose set forth.

3. The combination, with tight and loose pulleys, belt, belt-guide, and a spring acting to force the belt on the loose pulley, of a lever, rock-shaft, and connections by which the belt is forced on the tight pulley, wedge 39, and a notched lever for engaging the hand-lever, said notched lever carrying at its opposite end spring-actuated rod 35, having flange 36 and roller 37.

4. Rod 35, having a flange and roller, between which the wire passes and by which said parts are held at their normal position, and spring 38, which carries said parts inward when the wire is exhausted, in combination with lever 32, which carries said rod, wedge 39, and mechanism—for example, the hand-lever, rock-shaft, and connections—by which the belt is controlled.

5. Lever 32, adapted to engage the hand-lever, whereby the belt is held on the tight pulley against the power of spring 33, in combination with rod 35, flange 36, roller 37 or its equivalent, spring 38, and reciprocating wedge 39, whereby lever 32 is tilted and the hand-lever is automatically released when the piece of wire is exhausted, thus allowing spring 33 to throw the belt on the loose pulley, which stops the machine.

6. Lever 32, having head 34, rod 35, passing through it, and having at its inner end a spring, 38, acting to draw it inward, and at its outer end a flange and roller, between which the wire to be operated upon passes, in combination with a hand-lever which controls the belt and is engaged by lever 32, and reciprocating wedge 39, which normally passes between the flange and head, but passes under the flange, thus tilting lever 32 and releasing the hand-lever when the wire is exhausted and the flange is moved toward the left.

7. Hand-lever 29, having pin 30, in combination with lever 32, having notch 31 and head 34, rod 35, having flange, roller, and spring, wedge 39, the rock-shaft and connections, sliding block, belt-guide, and spring 33.

8. Lever 32, rod 35, spring 38, and a flange and roller upon said rod, in combination with reciprocating wedge 39, which normally passes by the side of said flange, but when the parts are drawn outward by spring 38 passes under said flange and tilts the lever, as and for the purpose set forth.

9. In a wire-nail machine, dies secured to die-blocks, ways in which said die-blocks slide, and means—for example, screws engaging the die-blocks—whereby the dies are adjusted by movement of the blocks.

10. The combination, with the upper die-block, of a screw-bolt, 47, by which said die-block is carried, and a cross-piece which supports said screw-bolt and in which it turns freely, the adjustment of the die-block being accomplished by slight rotation of said screw-bolt 47.

11. The upper die-block and screw-bolt 47, in combination with rods 49 and cross-piece 48, the latter being pivoted to swing on one of said rods, and having notches adapted to engage the other rod and screw-bolt 47, thus permitting the dies to be removed by swinging said cross-piece out of the way.

12. The combination, with the upper die-block and rods 49, by which it is carried, of a lever, 50, to which said rods are pivoted, the forward end of said lever being pivoted to the bed of the machine and the rear end provided with rollers which are adapted to bear against cams 53 on the main shaft.

13. Cams 53, double lever 50, and spring 54, in combination with rods 49 and the upper die-block, carried thereby, the arrangement being such that each revolution of the cams causes an upward and downward movement of the die-block.

14. The combination, with the feeding mechanism and stationary lower die, of an upper die, rods for carrying said upper die, and mechanism—for example, lever 50 and cams 53—for imparting reciprocating motion to said upper die.

15. The combination, with the dies, of a bunter carried by a cross-head, means for adjusting the bunter, consisting of an externally-threaded sleeve engaging a threaded recess in the cross-head, and a check-nut, 62, and a crank and connecting-rod for imparting motion to the cross-head.

16. In a wire-nail machine, cutting mechanism consisting, essentially, of straight rods having cutting-edges at their inner ends and blocks having longitudinal holes corresponding with said rods, and slots leading into said holes, in combination with bolts which clamp the rods in place, and mechanism—for example, slide-cams—operated from the main shaft for imparting motion to the cutters.

17. The combination, with the cutters, of blocks having longitudinal holes to receive the cutters, horizontal slots leading into said holes, and bolts which pass into the blocks and across the slots, whereby the cutters are firmly held after being placed at the desired adjustment relatively to each other.

18. The combination, with the dies and the cutters, of blocks in which the cutters are secured and which are provided with slots 69, and slides to which the blocks are secured by bolts passing through said slots, whereby said blocks and cutters may be adjusted relatively to the dies to determine the amount of metal in each nail-head.

19. The combination, with the cutters, of blocks in which they are adjustably secured, slides to which the blocks are adjustably secured, slide-cams 76, and springs 82, whereby the return movement is imparted to the slides.

20. The slide-cams having inclines, the slides having rollers at their outer ends, and springs 82, which hold the rollers against the cams, in combination with the cutters carried by said slides, and eccentrics, straps, and connecting-rods, whereby reciprocating motion is imparted to the slide-cams.

21. The slide-cams, slides, blocks, and cutters, in combination with stop-pin 73 and screw 74, whereby the edges of the cutter are prevented from coming in contact.

22. The cutter-blocks having holes 70, slots 71, and bolts 68 and 72, in combination with the cutters, slides 67, having pins 80, springs 82, and the slide-cams.

23. The clearing mechanism consisting, essentially, of an arm, 85, detachably secured in a carrier, 86 88, and a spring, 89, in combination with a slide having an incline at its forward end, a spring, 95, and a cam, 94, on the main shaft.

24. The combination, with the clearer-arm and the carrier, of spring 89, the slide, spring 95, and cam 94.

25. The carrier, arm 85, set-screw 87, guide-pin 91, and spring 89, in combination with cam 94 on the main shaft, slide 93, having incline 92, and spring 95.

In testimony whereof I affix my signature in presence of two witnesses.

HARRY B. LESTER.

Witnesses:
ALBERT H. MILLS,
CHARLES H. BLAKE.